United States Patent
Hori

(10) Patent No.: US 6,304,391 B1
(45) Date of Patent: Oct. 16, 2001

(54) OBJECT LENS SUPPORTING UNIT CAPABLE OF OFFSETTING POSITIONAL DEVIATION OF THE LENS CAUSED BY WARP OF SUSPENSION WIRE AND METHOD OF ASSEMBLING THE UNIT

(75) Inventor: Ken'ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/491,818

(22) Filed: Jan. 26, 2000

(30) Foreign Application Priority Data

Jan. 27, 1999 (JP) .................................................. 11-018179

(51) Int. Cl.$^7$ ..................................................... G02B 7/02
(52) U.S. Cl. ........................ 359/813; 359/814; 369/44.14; 369/44.15

(58) Field of Search ..................................... 359/813, 814, 359/822, 823, 824; 369/244, 44.12, 44.14, 44.15, 44.16, 44.22

(56) References Cited

U.S. PATENT DOCUMENTS

| 5,414,563 | * | 5/1995 | Tanaka | 359/814 |
| 5,646,789 | * | 7/1997 | Lee | 359/814 |
| 5,666,235 | * | 9/1997 | Izuka | 359/814 |

* cited by examiner

*Primary Examiner*—Loha Ben
(74) *Attorney, Agent, or Firm*—Frishauf, Holtz, Goodman, Langer & Chick, P.C.

(57) ABSTRACT

A hole portion of a supporting frame is formed so as to permit a positional deviation of a suspension wire deviated from a normal position in at least one of tracking and focusing directions.

4 Claims, 4 Drawing Sheets

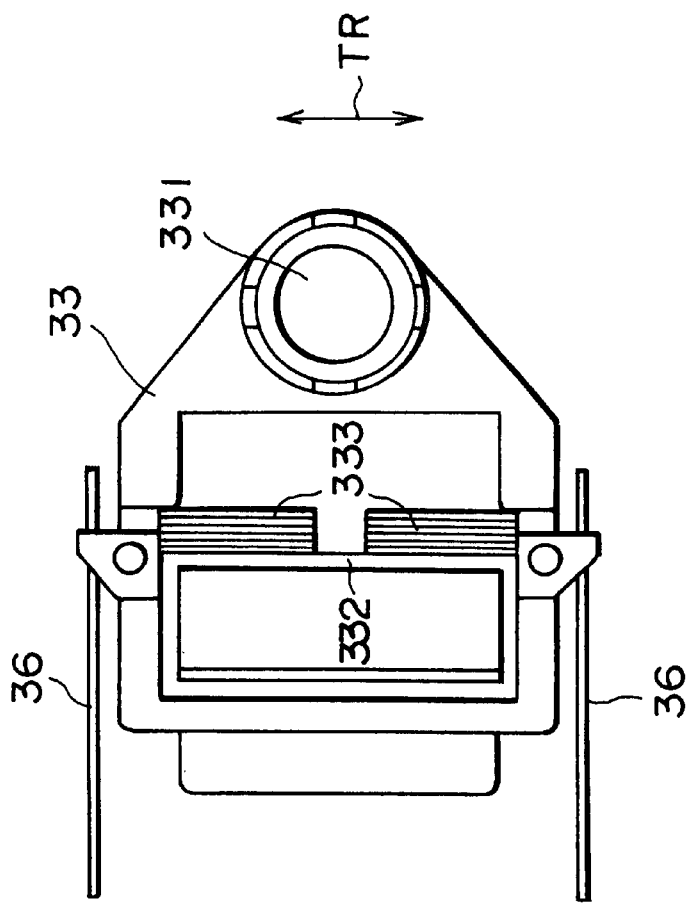
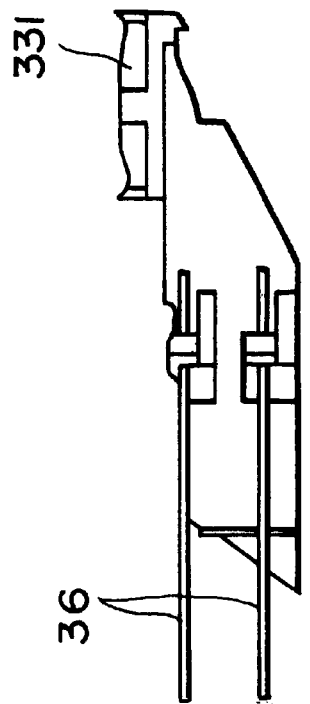
FIG. 2A PRIOR ART
FIG. 2B PRIOR ART
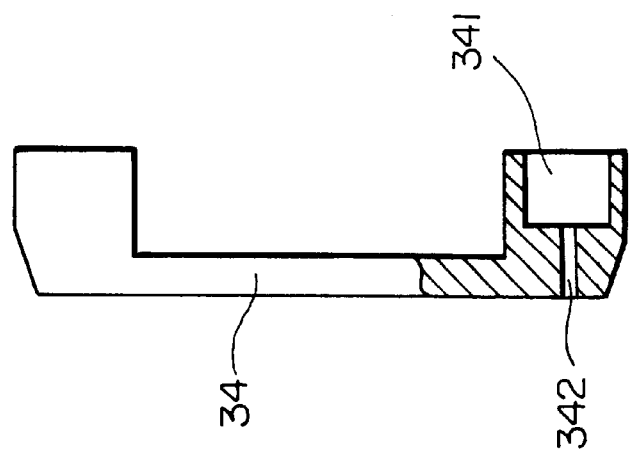
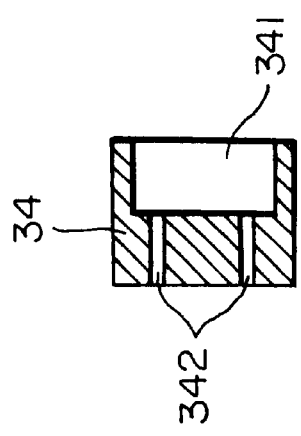

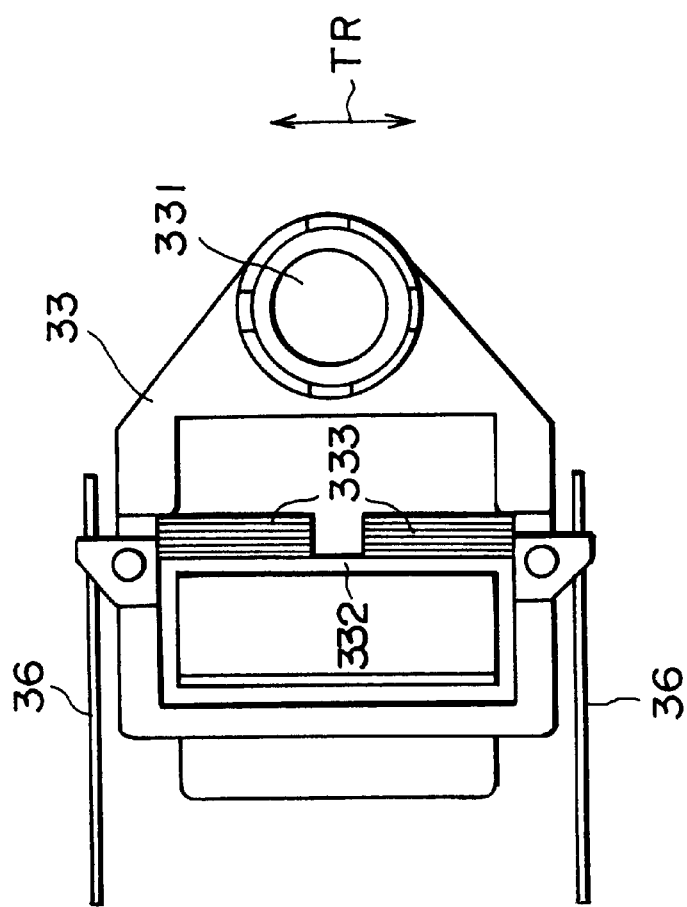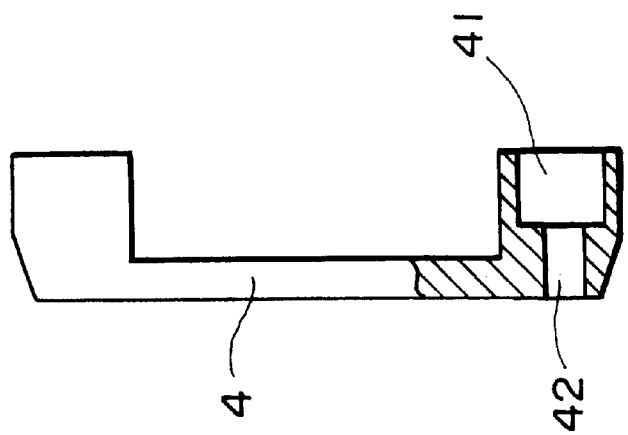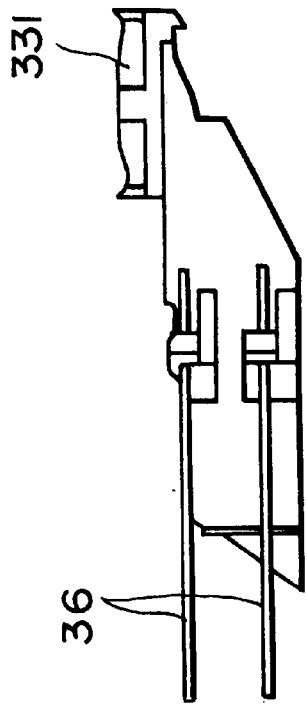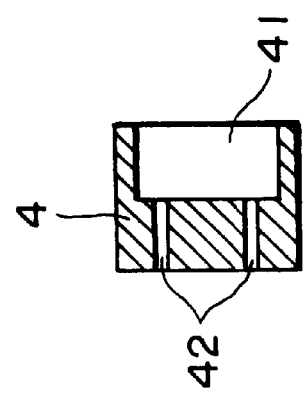
FIG. 4A
FIG. 4B

OBJECT LENS SUPPORTING UNIT CAPABLE OF OFFSETTING POSITIONAL DEVIATION OF THE LENS CAUSED BY WARP OF SUSPENSION WIRE AND METHOD OF ASSEMBLING THE UNIT

BACKGROUND OF THE INVENTION

This invention relates to an object lens supporting unit for supporting an object lens used in an optical pick-up of an optical disk drive, in particular, to the unit supporting so as to permit the object lens to move by suspension wires and a method of assembling the unit.

Generally, as a recording apparatus connected to an electrical apparatus such as a personal computer, a recording apparatus using a semiconductor memory chip or using magnetically and/or optically recording medium is well known. An optical disk drive as a kind of the lafter can read data from an optical recording medium of disk type by irradiating laser beam to the medium and optically sensing reflected laser beam from the medium. The object lens supporting unit according to this invention is applied to the optical disk drive. The optical disk drive can further write data to the optical recording medium of disk type by irradiating laser beam to the medium. The object lens supporting unit according to this invention is applied to the optical disk drive.

The optical recording media of disk type are roughly classified into media capable of reading only or media capable of reading and writing. As the media capable of reading only, an Audio CD (an Audio Compact Disc), a CD-ROM (a Compact Disc-Read Only Memory), a DVD-Audio (a Digital Versatile Disc-Audio), a DVD-Video (a Digital Versatile Disc-Video), a DVD-ROM (a Digital Versatile Disc-Read Only Memory), and an SACD (a Super Audio Compact Disc) have been known. As the media capable of reading and writing, a CD-R (a Compact Disc-Recordable), a CD-RW (a Compact Disc-ReWritable), a DVD-RAM (a Digital Versatile Disc-Random Access Memory), and a DVD-RW (a Digital Versatile Disc-ReWritable) have been known.

In order to write data to the CD-R, it is necessary to use an optical disk drive for the exclusive use and a writing application software for the exclusive use. In the CD-R, it is impossible to delete data written once thereon while it is possible to additionally and repeatedly write new data thereon.

A conventional object lens supporting unit applied in a CD-R drive as an optical disk drive will be described.

The CD-R drive has an optical pick-up. The optical pick-up is driven in a direction that traverses innumerable tracks formed on a CD-R and is stopped on a target track so as to irradiate a laser beam to the target track and to optically sense a reflected laser beam from the target track/irradiate a laser beam to the target track. The optical pick-up has a laser source for generating the laser beam, an optical system for transmitting the laser beam irradiated from the laser source to the CD-R and reflected by the CD-R, and a light sensor for sensing the reflected laser beam. The optical pick-up is movable in a tracking direction (a diameter direction of the CD-R). Furthermore, an object lens included in the optical system is supported by an object lens supporting unit so that it is slightly movable in the tracking direction and a focusing direction (a thickness direction of the CD-R).

The optical pick-up of the CD-R drive is designed so as to deal with both of reading data from the CD-R and writing data to the CD-R because the CD-R is capable of reading and writing data. Herein, a power of the laser beam of the optical pick-up must be changed at which data are read and data are written. This is because it is necessary for writing data a power higher than a power for reading data in order to form pits on the CD-R by irradiating the laser beam. For example, the power for writing is approximately 10 to 20 times as high as the power for reading.

The laser beam generated from the laser source is transmitted through the optical system (a diffraction grating, a beam splitter, a collimator, and the object lens) and irradiated on the CD-R. On the other hand, the laser beam reflected from the CD-R is transmitted through the optical system (the object lens, the collimator, and the beam splitter) and sensed by the light sensor. During the laser beam is transmitted through the optical system, the object lens movably supported by suspension wires are driven by a driving mechanism so as to be adjusted on an appropriate position in the focusing and the tracking directions. The driving mechanism has focusing and tracking coil. The focusing and the tracking coils are provided by the object lens supporting unit.

Often, the suspension wire has been already warped in a stage when the suspension wire is prepared in order to assembling the object lens supporting unit. This is because the suspension wire is like as a piano wire. If the object lens is supported by the warped suspension wire, an optical axis of the object lens is deviated in the tracking direction from a standard or a datum position. Furthermore, even if the object lens is supported by the warped suspension wire with the optical axis in the standard position, the suspension wire and the other parts of the object lens supporting unit adjacent to the wire are stressed. The object lens supporting unit in which the parts are stressed degrades in movement. Although it may deal with the matter mentioned above to assemble the object lens supporting unit with sorting out the warped suspension wire and only using the suspension wire not warped, it reduces manufacturing efficiency and increases manufacturing cost.

SUMMARY OF THE INVENTION

It is an object of this invention to deal with disadvantages mentioned above and to therefore provide an object lens supporting unit capable of dealing with the matter caused by warp of the suspension wire without spoiling manufacturing efficiency and cost.

It is another object of this invention to provide a method of assembling an object lens supporting unit capable of dealing with the matter caused by warp of the suspension wire without spoiling manufacturing efficiency and cost.

The other object, features, and advantages of this invention will become clear as the description proceeds.

This invention is directed to an object lens supporting unit used for supporting an object lens, the object lens converging a laser beam irradiated from a laser source on an optical disk, so that the object lens is movable in tracking and focusing directions parallel to diameter and thickness directions of the optical disk. The unit comprises a supporting frame and a lens holder, the supporting frame having a hole portion for containing and gluing a suspension wire therein, the lens holder mounting the object lens thereon, which being supported by the supporting frame through the suspension wire, and which being movable in the tracking and the focusing directions. The hole portion is formed so as to permit a positional deviation of the suspension wire deviated from a normal position in at least one of the tracking and the focusing directions.

This invention is further directed to a method of assembling an object lens supporting unit used for supporting an object lens, the object lens converging a laser beam irradiated from a laser source on an optical disk, so that the object lens is movable in tracking and focusing directions parallel to diameter and thickness directions of the optical disk. The unit comprises a supporting frame and a lens holder, the supporting frame having a hole portion for containing and gluing a suspension wire therein, the lens holder mounting the object lens thereon, which being supported by the supporting frame through the suspension wire, and which being movable in the tracking and the focusing directions. The method comprising the steps of previously forming the hole portion on the supporting frame so that the hole portion permits a positional deviation of the suspension wire deviated from a normal position in at least one of the tracking and the focusing directions, attaching the object lens to the lens holder, gluing one end of the suspension wire on the lens holder, inserting the other end of the suspension wire glued on the lens holder into the hole portion, adjusting a position of the lens holder so that the object lens is placed in a normal position based on a position of the supporting frame, and providing adhesive between the hole portion and the suspension wire so that the suspension wire is glued on the supporting frame.

BRIEF DESCRIPTION OF THE DRAWINGS

FIG. 2A is a planview of the unit in FIG. 1A with a part cut away;

FIG. 2B is a side view of the unit in FIG. 1A with a part cut away;

FIG. 4A is a plan view of the unit in FIG. 3A with a part cut away; and

FIG. 4B is a side view of the unit in FIG. 3A with a part cut away.

DESCRIPTION OF THE PREFERRED EMBODIMENTS

Figure 1A:
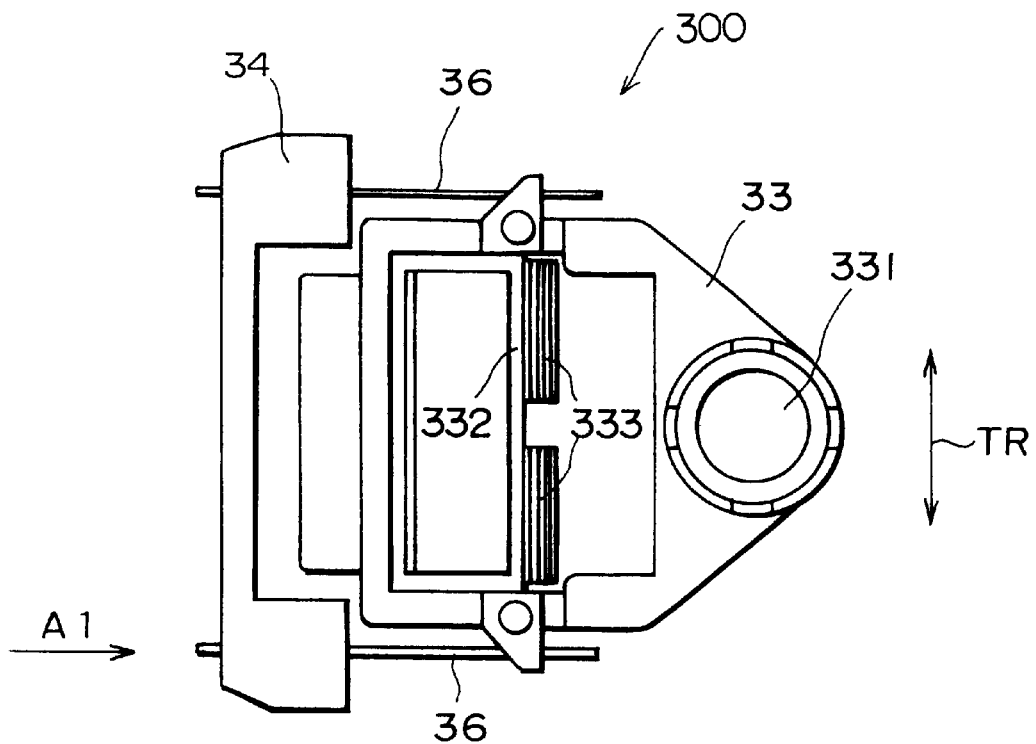
FIG. 1A is a plan view of a conventional object lens supporting unit.

In order to facilitate an understanding of the present invention, description will be at first made with reference to the drawing about the object lens supporting unit as the conventional technique related to this invention described in the background of this specification.

Figure 1B:
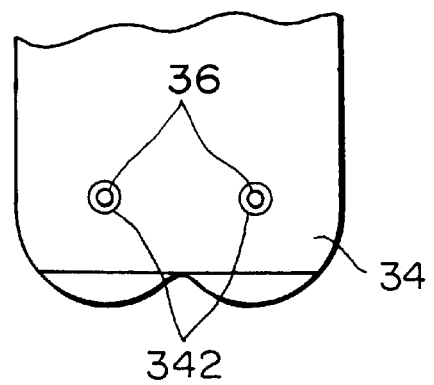
FIG. 1B is an enlarged view of a part of the unit in FIG. 1A as seen from a direction of an arrow A1.

Referring to FIGS. 1A and 1B, an object lens 331 is used for converging a laser beam irradiated from a laser source (not shown) on an optical disk (not shown). An object lens supporting unit 300 is used for supporting the object lens 331 so that the object lens 331 is movable in a tracking direction TR and a focusing direction which are parallel to a diameter direction and a thickness direction, respectively, of the optical disk.

The object lens supporting unit 300 comprises a supporting frame 34 and a lens holder 33. The supporting frame 34 has four hole portions 342 for containing and gluing four suspension wires 36 having elasticity therein. The lens holder 33 mounts the object lens 331 thereon. The lens holder 33 is supported by the supporting frame 34 through the suspension wires 36 and is movable in the tracking direction TR and the focusing direction. The lens holder 33 is provided with two tracking coils 333 and a focusing coil 332.

Referring to FIGS. 2A and 2B together with FIGS. 1A and 1B, the supporting frame 34 is provided with two concave portions 341. The concave portions 341 are connected with two of the hole portions 342, respectively.

The object lens supporting unit 300 is assembled as follows. The object lens 331, the focusing coil 332, and the tracking coils 333 are attached to the lens holder 33. One end of each of the suspension wires 36 (a right side of the wire in FIGS. 1A, 2A, and 2B) is glued on the lens holder 33. The other end of each of the suspension wires 36 (a left side of the wire in FIGS. 1A, 2A, and 2B) is inserted into the hole portion 342 through the concave portion 341. Adhesive is provided to a space between the hole portion 342 and the suspension wire 36 so that the suspension wire 36 is glued on the supporting frame 34. Vibration suppressant such as silicone oil is provided to a space between the concave portion 341 and the suspension wire 36.

After going through steps mentioned above, the object lens supporting unit 300 has completed. Thus, the object lens 331 is supported, so as to be movable and be vibration-restrained, by the supporting frame 34 through the suspension wires 36.

Hereafter, the object lens supporting unit 300 is assembled into an optical disk drive.

The object lens supporting unit 300 has problems described in the background.

Now, a preferred embodiment of the present invention will be described with reference to Drawings.

Figure 3A:
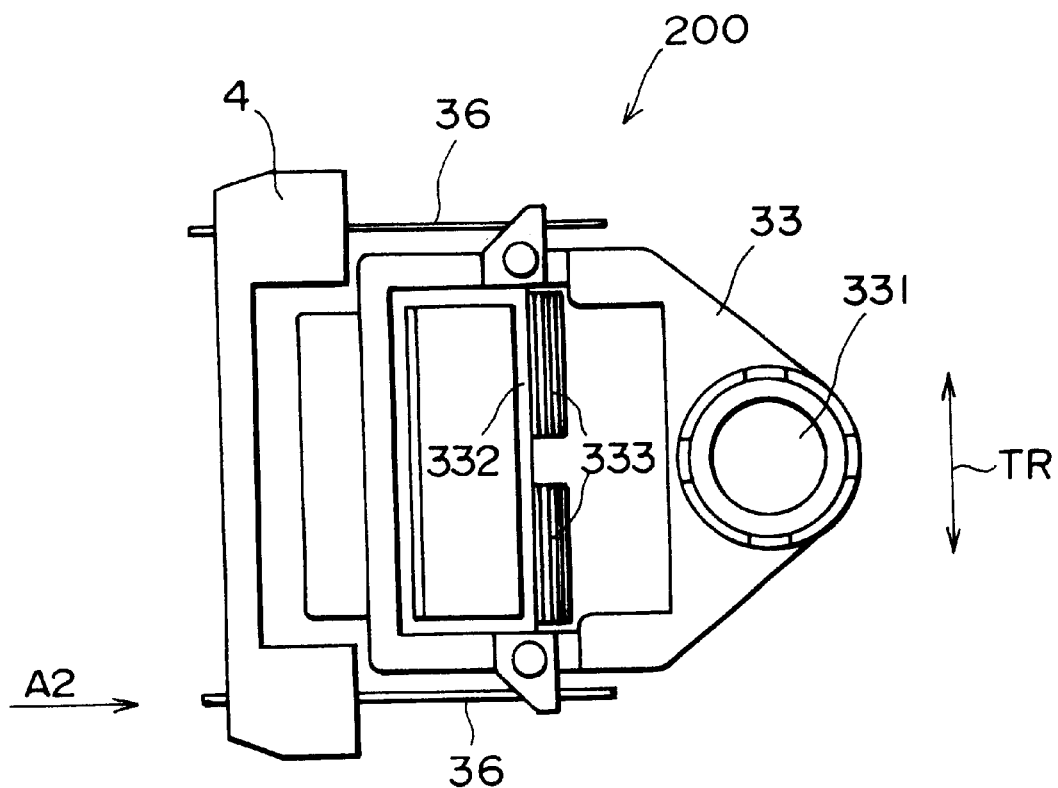
FIG. 3A is a plan view of an object lens supporting unit according to an embodiment of this invention.
Figure 3B:
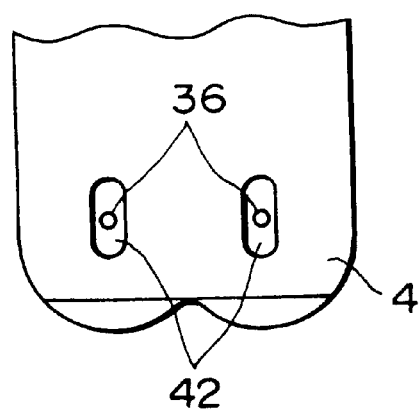
FIG. 3B is an enlarged view of a part of the unit in FIG. 3A as seen from a direction of an arrow A2.

Referring to FIGS. 3A and 3B, an object lens supporting unit 200 according to an embodiment of this invention is, like the conventional object lens supporting unit 300, used for supporting the object lens 331 so that the object lens 331 is movable in the tracking direction TR and the focusing direction.

The object lens supporting unit 200 comprises a supporting frame 4 and a lens holder 33. The supporting frame 4 has four hole portions 42 for containing and gluing four suspension wires 36 therein. The lens holder 33 mounts the object lens 331 thereon. The lens holder 33 is supported by the supporting frame 4 through the suspension wires 36 and is movable in the tracking direction TR and the focusing direction. The lens holder 33 is provided with two tracking coils 333 and a focusing coil 332.

Referring to FIGS. 3A and 3B accompanied with FIGS. 4A and 4B, the supporting frame 4 is provided with two concave portions 41. The concave portions 41 are connected with two of the hole portions 42, respectively.

The hole portions 42 are formed in elliptical hole form such that the major axis thereof are parallel to the tracking direction TR. In other words, the hole portion 42 are formed so as to permit a positional deviation of the suspension wire 36 deviated from a normal position in the tracking direction TR.

The object lens supporting unit 200 is assembled as follows. In this embodiment, the suspension wires 36 are sampled at random without sorting out the warped suspension wire. This means that the suspension wires 36 may have the warp in this embodiment The object lens 331, the focusing coil 332, and the tracking coils 333 are attached to the lens holder 33. One end of each of the suspension wires 36 sampled at random without sorting out the warped suspension wire is glued on the lens holder 33. The other end of each of the suspension wires 36 is inserted into the hole portion 42 through the concave portion 41 so as to be permitted the positional deviation thereof deviated from the normal position in the tracking direction TR.

The position of the lens holder 33 is adjusted so that the object lens 331 is placed at the normal position based on the position of the supporting frame 4. Herein, it is preferably to use a jig (not shown) for putting the supporting frame 4 and the lens holder 33 thereon so that the lens holder 33 is positioned at the normal position based on the supporting frame 4.

Adhesive is provided to a space between the hole portion 42 and the suspension wire 36 so that the suspension wire 36 is glued on the supporting frame 4. Vibration suppressant such as silicone oil is provided to a space between the concave portion 41 and the suspension wire 36.

After going through steps mentioned above, the object lens supporting unit 200 has completed. Thus, the object lens 331 is supported, so as to be positioned in the normal position, be movable, and be vibration-restrained, by the supporting frame 4 through the suspension wires 36.

Hereafter, the object lens supporting unit 200 is assembled into an optical disk drive.

While the invention has thus far been described in conjunction with the embodiment thereof, it will readily be possible to put this invention into practice in various other manners.

For example, although the above-mentioned embodiment is formed so as to deal with the deviation of the object lens in the tracking direction that caused by the warp of the suspension wire, this invention can adopt a form capable of dealing with the deviation of the object lens in the focusing direction or a form capable of dealing with the deviation of the object lens in the tracking and the focusing directions. Namely, the supporting frame is provided with a hole portion enlarged in directions such that the suspension wire is warped in order to permit the warp of the suspension wire.

What is claimed is:

1. An object lens supporting unit used for supporting an object lens, said object lens converging a laser beam irradiated from a laser source on an optical disk, so that said object lens is movable in tracking and focusing directions parallel to diameter and thickness directions, respectively, of said optical disk, said unit comprising a supporting frame and a lens holder, said supporting frame having a hole portion for containing and gluing a suspension wire therein, said lens holder mounting said object lens thereon, said lens holder being supported by said supporting frame through said suspension wire, and said lens holder being movable in said tracking and said focusing directions;

wherein said hole portion is formed so as to permit a positional deviation of said suspension wire deviated from a normal position in at least one of said tracking and said focusing directions.

2. An object lens supporting unit as claimed in claim 1, wherein said hole portion is an elliptical hole such that the major axis thereof is parallel to said tracking or said focusing direction.

3. A method of assembling an object lens supporting unit used for supporting an object lens, said object lens converging a laser beam irradiated from a laser source on an optical disk, so that said object lens is movable in tracking and focusing directions parallel to diameter and thickness directions, respectively, of said optical disk, said unit comprising a supporting frame and a lens holder, said supporting frame having a hole portion for containing and gluing a suspension wire therein, said lens holder mounting said object lens thereon, said lens holder being supported by said supporting frame through said suspension wire, and said lens holder being movable in said tracking and said focusing directions, said method comprising the steps of:

previously forming said hole portion on said supporting frame so that said hole portion permits a positional deviation of said suspension wire deviated from a normal position in at least one of said tracking and said focusing directions;

attaching said object lens to said lens holder;

gluing one end of said suspension wire on said lens holder;

inserting the other end of said suspension wire glued on said lens holder into said hole portion;

adjusting a position of said lens holder so that said object lens is placed in a normal position based on a position of said supporting frame; and providing adhesive between said hole portion and said suspension wire so that said suspension wire is glued on said supporting frame.

4. A method of assembling an object lens supporting unit as claimed in claim 3, wherein an elliptical hole is previously formed as said hole portion such that the major axis thereof is parallel to said tracking or said focusing direction.

* * * * *